United States Patent
Al-Omari et al.

(10) Patent No.: US 7,418,629 B2
(45) Date of Patent: Aug. 26, 2008

(54) SYNCHRONIZING TRIGGERING OF MULTIPLE HARDWARE TRACE FACILITIES USING AN EXISTING SYSTEM BUS

(75) Inventors: Ra'ed Mohammad Al-Omari, Cedar Park, TX (US); Michael Stephen Floyd, Austin, TX (US); Paul Frank Lecocq, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 11/055,870

(22) Filed: Feb. 11, 2005

(65) Prior Publication Data

US 2006/0184835 A1 Aug. 17, 2006

(51) Int. Cl.
*G06F 11/00* (2006.01)
(52) U.S. Cl. ........................................ 714/30
(58) Field of Classification Search ............... 714/27, 714/30, 32, 40, 45, 39
See application file for complete search history.

(56) References Cited

U.S. PATENT DOCUMENTS

| | | | |
|---|---|---|---|
| 4,590,550 A * | 5/1986 | Eilert et al. .................... 714/45 |
| 4,835,675 A * | 5/1989 | Kawai ........................ 714/45 |
| 5,206,948 A * | 4/1993 | De Angelis et al. ........... 714/45 |
| 5,210,862 A * | 5/1993 | DeAngelis et al. ............ 714/45 |
| 5,642,478 A * | 6/1997 | Chen et al. .................... 714/45 |
| 5,890,217 A * | 3/1999 | Kabemoto et al. .......... 711/141 |
| 6,134,676 A * | 10/2000 | VanHuben et al. ............ 714/39 |
| 6,857,083 B2 * | 2/2005 | Floyd et al. ................... 714/30 |
| 6,912,673 B1 * | 6/2005 | Wyland ....................... 714/43 |
| 7,080,289 B2 * | 7/2006 | Swaine et al. ................. 714/45 |
| 7,152,186 B2 * | 12/2006 | Airaud et al. ................. 714/30 |
| 7,200,776 B2 * | 4/2007 | Harris ........................ 714/45 |
| 7,213,169 B2 * | 5/2007 | Dodson et al. ................ 714/30 |
| 7,269,756 B2 * | 9/2007 | Baartmans et al. ............ 714/30 |
| 2003/0196141 A1 * | 10/2003 | Shaw ......................... 714/27 |

(Continued)

OTHER PUBLICATIONS

Al-Omari et al., Method, Apparatus, and Computer Program Product in a Processor for Performing In-Memory Tracing Using Existing Communication Paths, filed Feb. 11, 2005.

(Continued)

*Primary Examiner*—Bryce P. Bonzo
*Assistant Examiner*—Neil D Miles
(74) *Attorney, Agent, or Firm*—Duke W. Yee; Diana R. Gerhardt; Peter B. Manzo

(57) ABSTRACT

A method, apparatus, and computer program product are disclosed in a data processing system for synchronizing the triggering of multiple hardware trace facilities using an existing bus. The multiple hardware trace facilities include a first hardware trace facility and a second hardware trace facility. The data processing system includes a first processor that includes the first hardware trace facility and first processing units that are coupled together utilizing the system bus, and a second processor that includes the second hardware trace facility and second processing units that are coupled together utilizing the system bus. Information is transmitted among the first and second processing units utilizing the system bus when the processors are in a normal, non-tracing mode, where the information is formatted according to a standard system bus protocol. Trigger events are transmitted to the hardware trace facilities utilizing the same standard system bus, where the trigger events are also formatted according to the standard system bus protocol.

3 Claims, 5 Drawing Sheets

U.S. PATENT DOCUMENTS

2004/0019828 A1* 1/2004 Gergen et al. .................. 714/30
2004/0199823 A1* 10/2004 Dodson et al. ................. 714/30
2005/0268171 A1* 12/2005 House et al. .................. 714/32
2006/0184835 A1* 8/2006 Al-Omari et al. ............. 714/45

OTHER PUBLICATIONS

Al-Omari et al., Method, Apparatus, and Computer Program Product in a Processor for Concurrently Sharing a Memory Controller Among a Tracing Process and Non-Tracing Processes Using a Programmable Variable Number of Shared Memory Write Buffers, filed Feb. 11, 2005.

Al-Omari et al., Method, Apparatus, and Computer Program Product in a Processor for Dynamically During Runtime Allocating Memory for In-Memory Hardware Tracing, filed Feb. 11, 2005.

Al-Omari et al., Method, Apparatus, and Computer Program Product in a Processor for Balancing Hardware Trace Collection Among Different Hardware Trace Facilities, filed Feb. 11, 2005.

* cited by examiner

SYNCHRONIZING TRIGGERING OF MULTIPLE HARDWARE TRACE FACILITIES USING AN EXISTING SYSTEM BUS

CROSS-REFERENCE TO RELATED APPLICATIONS

The subject matter of the present application is related to copending U.S. applications, Ser. No. 11/055,821, titled "Method, Apparatus, and Computer Program Product in a Processor for Performing In-Memory Tracing Using Existing Communication Paths", Ser. No. 11/055,845, titled "Method, Apparatus, and Computer Program Product in a Processor for Concurrently Sharing a Memory Controller Among a Tracing Process and Non-Tracing Processes Using a Programmable Variable Number of Shared Memory Write Buffers", Ser. No. 11/055,977, titled "Method, Apparatus, and Computer Program Product in a Processor for Dynamically During Runtime Allocating Memory for In-Memory Hardware Tracing", and Ser. No. 11/056,000, titled "Method, Apparatus, and Computer Program Product in a Processor for Balancing Hardware Trace Collection Among Different Hardware Trace Facilities", all filed on even date herewith, all assigned to the assignee thereof, and all incorporated herein by reference.

BACKGROUND OF THE INVENTION

1. Technical Field

The present invention is directed to data processing systems. More specifically, the present invention is directed to a method, apparatus, and computer program product for synchronizing the triggering of multiple hardware trace facilities using an existing system bus.

2. Description of Related Art

Making tradeoffs in the design of commercial server systems has never been simple. For large commercial systems, it may take years to grow the initial system architecture draft into the system that is ultimately shipped to the customer. During the design process, hardware technology improves, software technology evolves, and customer workloads mutate. Decisions need to be constantly evaluated and reevaluated. Solid decisions need solid base data. Servers in general and commercial servers in particular place a large demand on system and operator resources, so the opportunities to collect characterization data from them are limited.

Much of performance analysis is based on hardware-collected traces. Typically, traces provide data used to simulate system performance, to make hardware design tradeoffs, to tune software, and to characterize workloads. Hardware traces are almost operating system, application, and workload independent. This attribute makes these traces especialy well suited for characterizing the On-Demand and Virtual-Server-Hosting environments now supported on the new servers.

A symmetric multiprocessing (SMP) data processing server has multiple processors with multiple cores that are symmetric such that each processor has the same processing speed and latency. An SMP system could have multiple operating systems running on different processors, which are a logically partitioned system, or multiple operating systems running on the same processors one at a time, which is a virtual server hosting environment. Operating systems divide the work into tasks that are distributed evenly among the various cores by dispatching one or more software threads of work to each processor at a time.

A single-thread (ST) data processing system includes multiple cores that can execute only one thread at a time.

A simultaneous multi-threading (SMT) data processing system includes multiple cores that can each concurrently execute more than one thread at a time per processor. An SMT system has the ability to favor one thread over another when both threads are running on the same processor.

As computer systems migrate towards the use of sophisticated multi-stage pipelines and large SMP with SMT based systems, the ability to debug, analyze, and verify the actual hardware becomes increasingly more difficult, during development, test, and during normal operations. A hardware trace facility may be used which captures various hardware signatures within a processor as trace data for analysis. This trace data may be collected from events occurring on processor cores, busses (also called the fabric), caches, or other processing units included within the processor. The purpose of the hardware trace facility is to collect hardware traces from a trace source within the processor and then store the traces in a predefined memory location.

As used herein, the term "processor" means a central processing unit (CPU) on a single chip, e.g. a chip formed using a single piece of silicon. A processor includes one or more processor cores and other processing units such as a memory controller, cache controller, and the system memory that is coupled to the memory controller.

This captured trace data may be recorded in the hardware trace facility and/or within another memory. The term "in-memory tracing" means storing the trace data in part of the system memory that is included in the processor that is being traced.

There is need to have a global triggering mechanism that can be used to synchronize simultaneous collection of different traces. Simultaneous collection of different traces is sometimes important in tuning software, and/or characterizing workloads. For example, the developers are faced with the vexing problem of determining the origin of some rather long lock acquisition sequences in a multiprocessor system.

Moreover there is a need to have more than one trace facility simultaneously collecting different parts from the bus trace to reduce the chance of losing trace record because one trace facility alone can not handle the bus trace bandwidth. Therefore, a global triggering mechanism is needed that can control all trace facilities with the same triggers.

In the prior art, the multiple hardware trace facilities did not receive triggers utilizing an existing, standard bus and its standard bus protocols. A special purpose trigger bus existed that coupled existing hardware trace facilities together. This special purpose bus was dedicated to sending only triggers to the hardware trace facilities using a special trace bus protocol. Triggers were transmitted to the hardware trace facilities using only the special purpose dedicated bus.

In the prior art, only one hardware trace facility could be assigned to be the master. Thus, only the one hardware trace facility could send out triggers. All other hardware trace facilities had to be configured to receive triggers from this master.

Therefore, a need exists for a method, apparatus, and computer program product for synchronizing the triggering of multiple hardware trace facilities using an existing system bus.

SUMMARY OF THE INVENTION

A method, apparatus, and computer program product are disclosed in a data processing system for synchronizing the triggering of multiple hardware trace facilities using an existing bus. The multiple hardware trace facilities include a first hardware trace facility and a second hardware trace facility.

The data processing system includes a first processor that includes the first hardware trace facility and first processing units that are coupled together utilizing the system bus, and a second processor that includes the second hardware trace facility and second processing units that are coupled together utilizing the system bus. Information is transmitted among the first and second processing units utilizing the system bus when the processors are in a normal, non-tracing mode, where the information is formatted according to a standard system bus protocol. Trigger events are transmitted to the hardware trace facilities utilizing the same standard system bus, where the trigger events are also formatted according to the standard system bus protocol.

In addition, the tracing in the multiple hardware trace facilities can be synchronized by configuring one or more hardware trace facilities to be the masters. Other hardware trace facilities can be configured to be slaves. In this case, the master hardware trace facility will transmit the trace events that occur locally within the master's processor to the slave hardware trace facilities using the standard system bus and standard bus protocol. All of the hardware trace facilities, including the master and all slaves, will receive these events from the bus during a fixed number of bus clock cycles and be triggered by these events simultaneously.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
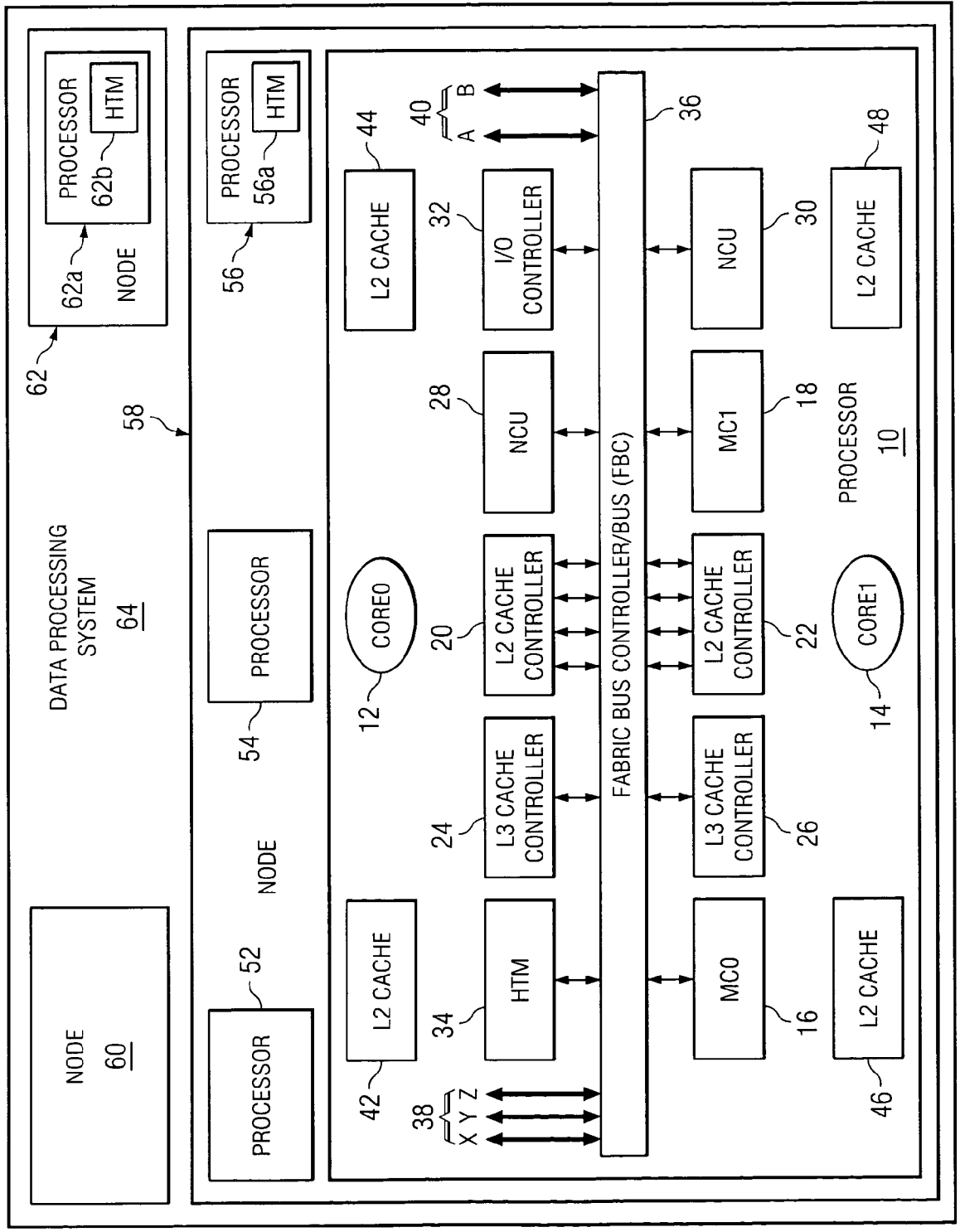
FIG. 1 is a high level block diagram of a processor that includes the present invention in accordance with the present invention.

A preferred embodiment of the present invention and its advantages are better understood by referring to the figures, like numerals being used for like and corresponding parts of the accompanying figures.

The present invention is a method, apparatus, and computer program product for synchronizing the triggering of multiple hardware trace facilities using an existing system bus.

There is need to have a global triggering mechanism that can be used to synchronize simultaneous collection of different traces. One trace facility is set up to collect a core trace and another is set up to record a fabric trace. Synchronization will be accomplished through the use of the global triggering mechanism. The software path for a long-delayed lock acquisition is "seeded" with the stop trigger command instruction. The trace collection buffers are configured to fill half the memory after receiving a stop trigger command. This effectively centers both traces on the long-delayed lock event. The workload is run and the trace facilities begin collection, wrapping when the end of the memory are reached. When the seeded path from lock acquisition occurs, the stop trigger command instruction is executed, causing the circular trace buffers to finish filling and freeze. One trace buffer now contains an instruction/address trace of the processor core that experienced the long-delay lock and the other trace contains the associated system fabric bus activity. The two traces can be used to analyze software efficiency, task contention, and hardware behavior.

The present invention provides a global triggering mechanism that can be used to synchronize simultaneous collection of different traces. According to the present invention, an existing system bus is used for transmitting communications among the processing units and a hardware trace facility that is included in a processor. In addition, this same system bus is used to transmit communications among different processors, their processing units, and hardware trace facilities. A standard bus protocol is used for all communications transmitted using the bus including bus traffic that includes triggers.

All bus traffic includes type identifiers in the address tag of each packet. The present invention identifies bus traffic as including a trigger by storing a special type identifier in the address tag of a packet that includes a trigger. This special type identifier identifies the packet as including a trigger.

Each hardware trace facility can be configured to be triggered using local triggers or global triggers. The HTM includes registers in which can be stored configuration information that identifies whether the HTM is configured to be triggered locally or globally.

Global triggering modes are provided to synchronize simultaneous collection of core traces with other core traces, and of bus traces with core traces. Time Stamps are saved in the traces in order to record a relative time between entries in a given trace. Multiple traces can be lined up based on those time stamps.

When a hardware trace facility is configured to be triggered by local triggers, the hardware trace facility will be triggered by only those triggers that occur within the processor that includes this hardware trace facility. When a hardware trace facility is configured to be triggered by global triggers, the hardware trace facility will be triggered by only those events that are snooped from the system bus. When configured to be triggered by global triggers, the hardware trace facility does not respond to triggers that occur within the processor that includes this hardware trace facility.

According to the present invention, more than one hardware trace facility can be configured to be a master. Thus, multiple master hardware trace facilities can exist concurrently. In this case with multiple master hardware trace facilities, more than one hardware trace facility can generate global triggers.

The tracing in the multiple hardware trace facilities can be synchronized by configuring one or more hardware trace facilities to be the master(s). Other hardware trace facilities can be configured to be slaves. In this case, the master(s) hardware trace facilities will transmit the trace events that occur locally within the master's processor to the slave hardware trace facilities using the standard system bus and standard bus protocol. All of the hardware trace facilities, including the masters and all slaves, will receive these events from the standard bus during a fixed number of bus clock cycles and be triggered by these events simultaneously.

When a particular hardware trace facility is configured to be the master hardware trace facility, that hardware trace facility is always configured to receive its triggers globally. In this manner, the master hardware trace facility and all other hardware trace facilities that are configured to receive their triggers globally will receive the trigger from the standard bus during a fixed number of clock cycles. The master hardware trace facility and all other hardware trace facilities that are configured to receive their triggers globally will be synchronized and will be triggered simultaneously.

The hardware trace facilities that are configured to be triggered locally will not snoop bus traffic for triggers. The hardware trace facilities that are configured to be triggered locally will disregard all bus traffic that includes triggers.

The following is a description of the tracing process executed by the present invention. According to the present invention, a control routine sends a notice to a hypervisor that is included within the data processing system telling the hypervisor to enable the hardware trace facility, referred to herein as a hardware trace macro (HTM), for tracing. The control routine also indicates a specified size of memory to request to be allocated to the HTM.

The hypervisor then enables the HTM for tracing by setting the trace enable bit within the HTM. The hypervisor stores the size of memory to request to be allocated in the address register in the HTM.

When the trace enable bit is set, the HTM then requests the hypervisor to allocate the particular size of memory that is specified in its address register. The hypervisor then dynamically allocates memory by selecting locations within its system memory. These selected locations are then marked as "defective". The contents of these registers are copied to a new location before trace data is stored in the selected locations. The processes, other than the HTM, that access these locations are then redirected to the new locations.

The hypervisor then notifies the HTM that the memory has been allocated by setting a "mem_alloc_done" "bit in the HTM memory control register that is included within the scan communications (SCOM) bus stage. The HTM then stores trace data in the allocated memory.

The allocated memory can be deallocated during runtime once the HTM finishes tracing.

The HTM looks like any other processing unit in the processor to the fabric. It uses the same data and addressing scheme, protocols, and coherency used by the other processing units in the processor. Therefore, there is no need for extra wiring or side band signals. There is no need for a special environment for verification since it will be verified with the standard existing verification functions.

The HTM captures hardware trace data in the processor and transmits it to a system memory utilizing a system bus. The system bus, referred to herein as the fabric and/or fabric bus controller and bus, is capable of being utilized by processing units included in the processor while the hardware trace data is being transmitted to the system bus. A standard bus protocol is used by these processing units to communicate with each other via the standard existing system bus.

According to the present invention, the hardware trace facility, i.e. the HTM, is coupled directly to the system bus. The memory controllers are also coupled directly to the system bus. The HTM uses this standard existing system bus to communicate with a particular memory controller in order to cause the memory controller to store hardware trace data in the system memory that is controlled by that memory controller.

The HTM transmits its hardware trace data using the system bus. The hardware trace data is formatted according to the standard bus protocol used by the system bus and the other processing units. The hardware trace data is then put out on the bus in the same manner and format used to transmit all other information.

The memory controller(s) snoop the bus according to prior art methods.

According to the present invention, when trace data is destined for a particular memory controller, the trace data is put on the bus as bus traffic that is formatted according to the standard bus protocol. The particular memory controller is identified in this bus traffic. The memory controller will then retrieve the trace data from the bus and cause the trace data to be stored in the memory controlled by this memory controller.

In a preferred embodiment, a data processing system includes multiple nodes. Each node includes four separate processors. Each processor includes two processing cores and multiple processing units that are coupled together using a system bus. The system busses of each processor in each node are coupled together. In this manner, the processors in the various nodes can communicate with processors in other nodes via their system busses following the standard bus protocol.

One or more memory controllers are included in each processor. The memory controller that is identified by the bus traffic can be any memory controller in the system. Each memory controller controls a particular system memory. Because the standard system bus and bus protocol are used by the HTM, the trace data can be stored in the system memory in the processor which includes the HTM that captured trace data by identifying, in the bus traffic, the memory controller that controls this memory. The trace data can instead be stored in a system memory in another processor in this node or in any other node by identifying, in the bus traffic, a memory controller in another processor in this node or a memory controller in a different node.

Prior to starting a trace, the HTM will be configured to capture a particular trace. The HTM will first request that system memory be allocated to the HTM for storing the trace data it is about to collect. This memory is then allocated to the HTM for its exclusive use. The memory may be located in any system memory in the data processing system regardless of in which processor the trace data is originating.

According to the present invention, the memory controller is connected directly to the fabric bus controller. The memory controller is not coupled to the fabric bus controller through a multiplexer.

The trace facility, i.e. the hardware trace macro (HTM), is coupled directly to the fabric bus controller as if it were any other type of storage unit, e.g. an L3 cache controller, an L2 cache controller, or a non-cacheable unit. The HTM uses cast out requests to communicate with the memory controllers. A cast out request is a standard type of request that is used by the other processing units of the processor to store data in the memory. Processing units in one processor can cast out data to the system memory in that processor to memory in other processors in this node or other processors in other nodes.

These cast out requests consist of two phases, address and data requests. These cast out requests are sent to the fabric bus controller which places them on the bus. All of the processing units that are coupled directly to the bus snoop the bus for address requests that should be processed by that processing unit. Thus, the processing units analyze each address request to determine if that processing unit is to process the request. For example, an address request may be a request for the allocation of a write buffer to write to a particular memory location. In this example, each memory controller will snoop the request and determine if it controls the system memory that includes the particular memory location. The memory controller that controls the system memory that includes the particular memory location will then get the cast out request and process it.

A cast out data request is used by the HTM to notify the fabric bus controller that the HTM trace buffer has trace data to be copied. The fabric bus controller then needs to copy the data. The fabric bus controller will use a tag, from the Dtag buffer, that includes an identification of a particular memory controller and a write buffer. The fabric bus controller then copies the data to the specific memory controller write buffer, which is identified by the tag.

Because the HTM uses cast out requests to communicate with the memory controllers, any memory controller, and thus any system memory, can be used for storing trace data. The fabric bus controller/bus transmits requests to the processing units in the processor that controls the HTM and also transmits requests to other processors in the same node as this processor and to other nodes as well. Therefore, a system memory in this processor, in another processor in this node, or in a processor in another node, can be used for storing trace data from this HTM.

FIG. 1 is a high level block diagram of a processor 10 that includes the present invention in accordance with the present invention. Processor 10 is a single integrated circuit chip. Processor 10 includes multiple processing units such as two processor cores, core 12 and core 14, a memory controller 16, a memory controller 18, an L2 cache controller 20, an L2 cache controller 22, an L3 cache controller 24, four quarters 42, 44, 46, and 48 of an L2 cache, an L3 cache controller 26, a non-cacheable unit (NCU) 28, a non-cacheable unit (NCU) 30, an I/O controller 32, a hardware trace macro (HTM) 34, and a fabric bus controller and bus 36. Communications links 38 are made to other processors, e.g. processor 52, 54, 56, inside the node, i.e. node 58, that includes processor 10. Communications links 40 are made to other processors in other nodes, such as nodes 60 and 62.

Each processor, such as processor 10, includes two cores, e.g. cores 12, 14. A node is a group of four processors. For example, processor 10, processor 52, processor 54, and processor 56 are all part of node 58. Processor 56 includes HTM 56a. There are typically multiple nodes in a data processing system. For example, node 58, node 60, and node 62 are all included in data processing system 64. Also, node 62 includes processor 62a and processor 62a includes HTM 62b. Thus, communications links 38 are used to communicate among processors 10, 52, 54, and 56. Communications links 40 are used to communicate among processors in nodes 58, 60, and 62.

Although connections are not depicted in FIG. 1, each core 12 and 14 is coupled to and can communicate with the other core and each processing unit depicted in FIG. 1 including memory controller 16, memory controller 18, L2 cache controller 20, L2 cache controller 22, L3 cache controller 24, L3 cache 26, non-cacheable unit (NCU) 28, non-cacheable unit (NCU) 30, I/O controller 32, hardware trace macro (HTM) 34, and fabric bus controller and bus 36. Each core 12 and 14 can also utilize communications links 38 and 40 to communicate with other cores and devices. Although connections are not depicted, L2 cache controllers 20 and 22 can communicate with L2 cache quarters 42, 44, 46, and 48.

Figure 2:
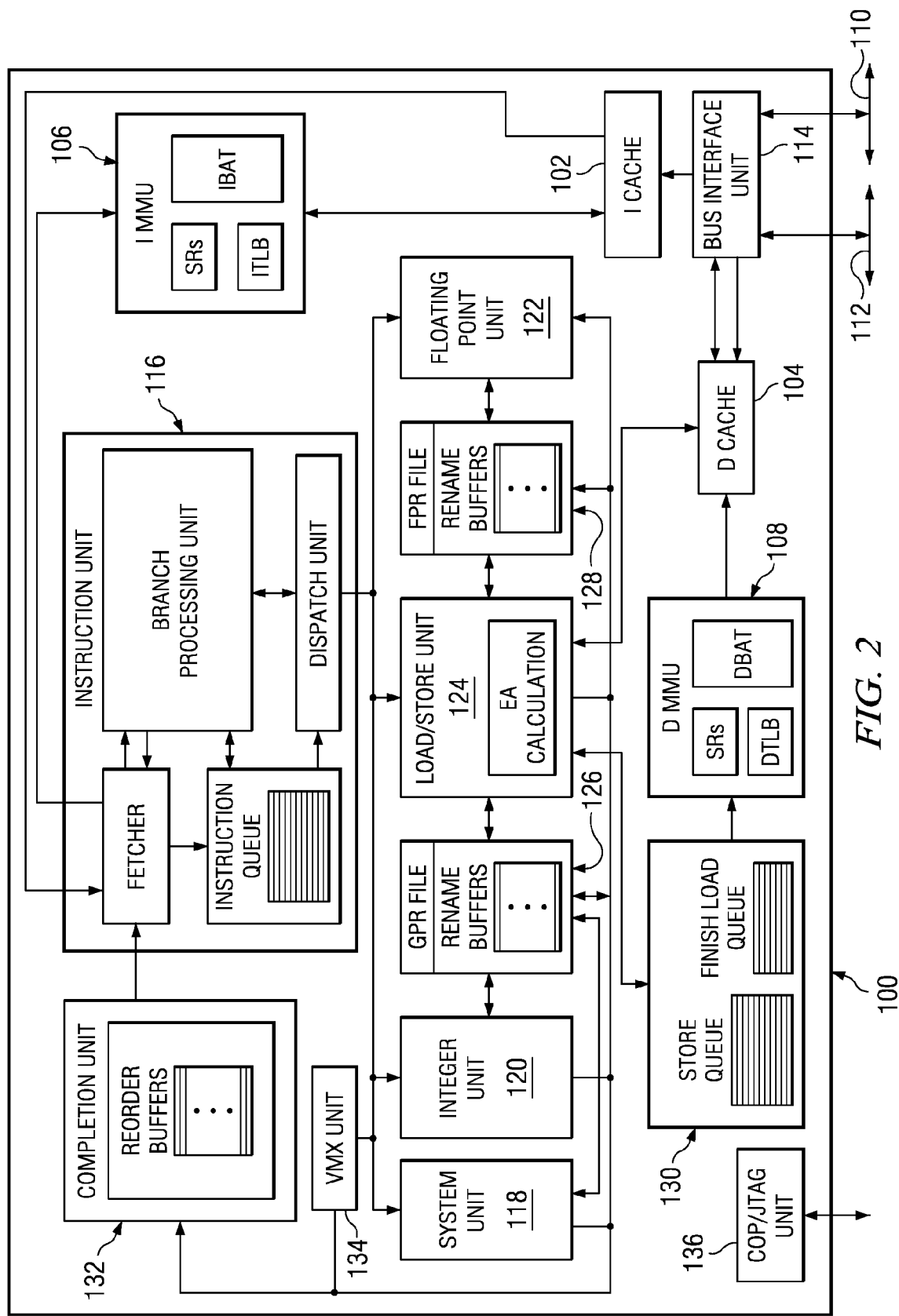
FIG. 2 is a block diagram of a processor core that is included within the processor of FIG. 1 in accordance with the present invention.

FIG. 2 depicts a block diagram of a processor core in which a preferred embodiment of the present invention may be implemented are depicted. Processor core 100 is included within processor/CPU chip 10 that is a single integrated circuit superscalar microprocessor (CPU), such as the PowerPC™ processor available from IBM Corporation of Armonk, N.Y. Accordingly, processor core 100 includes various processing units both specialized and general, registers, buffers, memories, and other sections, all of which are formed by integrated circuitry.

Processor core 100 includes level one (L1) instruction and data caches (I Cache and D Cache) 102 and 104, respectively, each having an associated memory management unit (I MMU and D MMU) 106 and 108. As shown in FIG. 2, processor core 100 is connected to system address bus 110 and to system data bus 112 via bus interface unit 114. Instructions are retrieved from system memory (not shown) to processor core 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue, and a dispatch unit.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or fixed-point unit 120 performs add, subtract, multiply, divide, shift or rotate operations on integers, retrieving operands from and storing results in integer or general purpose registers (GPR File) 126. Floating point unit 122 performs single precision and/or double precision multiply/add operations, retrieving operands from and storing results in floating point registers (FPR File) 128. VMX unit 134 performs byte reordering, packing, unpacking, and shifting, vector add, multiply, average, and compare, and other operations commonly required for multimedia applications.

Load/store unit 124 loads instruction operands from data caches 104 into integer registers 126, floating point registers 128, or VMX unit 134 as needed, and stores instructions results when available from integer registers 126, floating point registers 128, or VMX unit 134 into data cache 104. Load and store queues 130 are utilized for these transfers from data cache 104 to and from integer registers 126, floating point registers 128, or VMX unit 134. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor (COP) and joint test action group (JTAG) unit 136 provides a serial interface to the system for performing boundary scan interconnect tests.

The architecture depicted in FIG. 2 is provided solely for the purpose of illustrating and explaining the present invention, and is not meant to imply any architectural limitations. Those skilled in the art will recognize that many variations are possible. Processor core 100 may include, for example, multiple integer and floating point execution units to increase processing throughput. All such variations are within the spirit and scope of the present invention.

Figure 3:
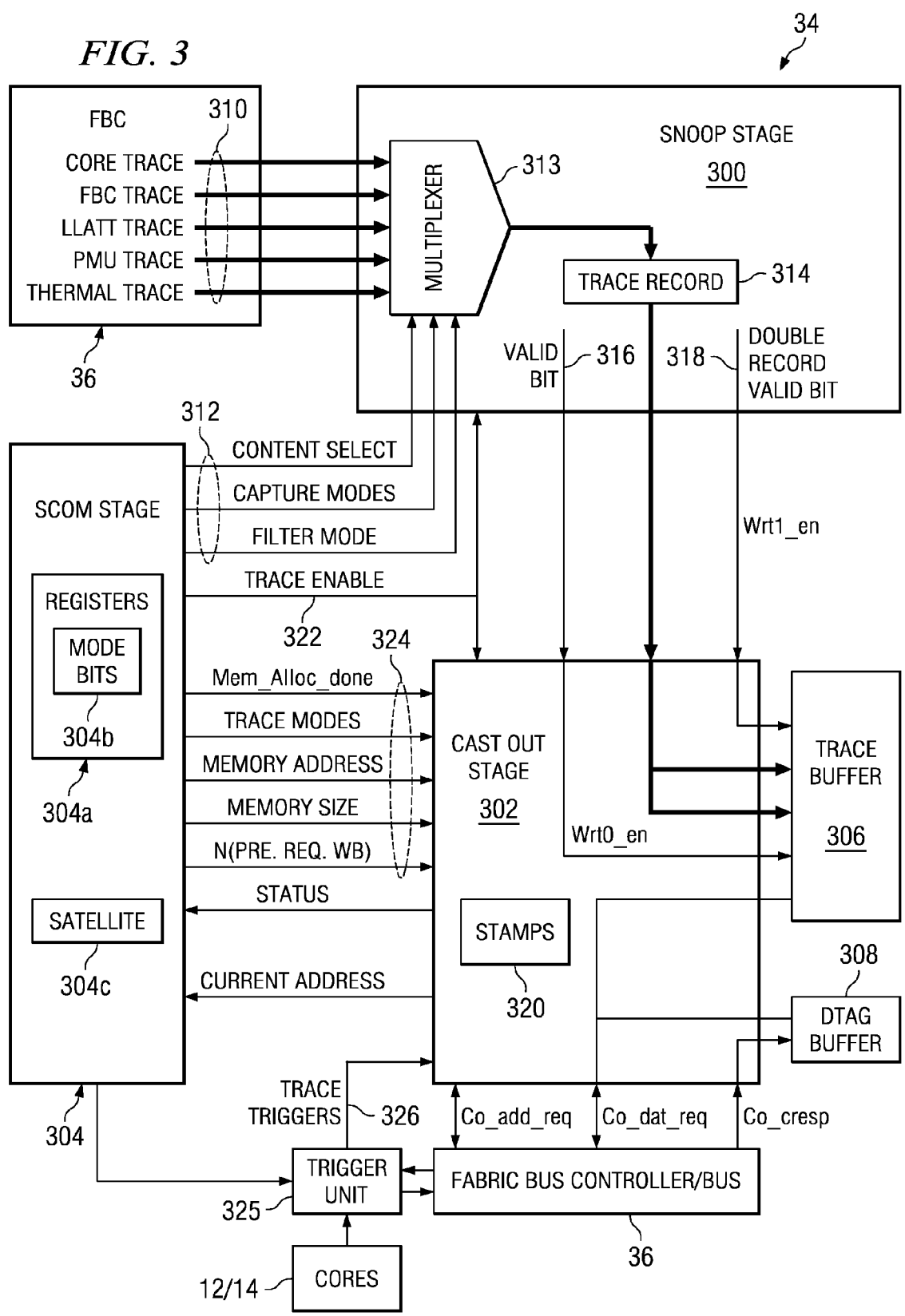
FIG. 3 is a block diagram of a hardware trace facility, such as a hardware trace macro (HTM), in accordance with the present invention.

FIG. 3 is a block diagram of a hardware trace macro (HTM) 34 in accordance with the present invention. HTM 34 includes a snoop stage 300, a trace cast out stage 302, and an SCOM stage 304. HTM 34 also includes an internal trace buffer 306 and a Dtag buffer 308.

Snoop stage 300 is used for collecting raw traces from different sources and then formatting the traces into multiple 128-bit frames. Each frame has a record valid bit and double record valid bit. The double record valid bit is used to identify if both the upper halves, e.g. bits 0-63, and the lower halves, e.g. bits 64-127, of the trace record are valid. If both bits, valid and double valid bits, are set to "1", both halves are valid. If the double valid bit is set to "0", only the upper half, i.e. bits 0-63, is valid. If both are set to "0" then none of the halves has valid data.

Snoop stage 300 snoops the traffic on fabric 36. Snoop stage 300 retrieves trace data from fabric 36 according to the filter and mode settings in HTM 34.

The trace data inputs to snoop stage 300 are the five hardware trace sources 310, select trace mode bits, capture mode bit, and filter mode bits 312. The outputs from this stage are connected to cast out stage 302. The outputs are a 128-bit trace record 314, a valid bit 316, and a double record valid bit 318.

There are five hardware trace sources: a core trace, a fabric trace, i.e. FBC trace, an LLATT trace, a PMU trace, and a thermal trace.

The core trace is an instruction trace for code streams that are running on a particular core.

The FBC trace is a fabric trace and includes all valid events, e.g. requests and responses, that occur on the fabric bus.

The LLATT trace is a trace from an L2 cache that is included within a processor. The LLATT trace includes load and store misses of the L1 cache generated by instruction streams running on a particular core.

The PMU trace is a performance monitor trace. It includes traces of events from the L3 cache, each memory controller, the fabric bus controller, and I/O controller.

The thermal trace includes thermal monitor debug bus data.

Trace cast out stage 302 is used for storing the trace record received from snoop stage 300 to one of the system memories or to another system memory in another processor that is either in this or another node. Trace cast out stage 302 is also responsible for inserting the proper stamps 320 into the trace data and managing trace buffer 306. Trace cast out stage 302 includes interfaces to fabric bus controller/bus 36, snoop stage 300, trace buffer 306, Dtag buffer 308, trace triggers, operation modes and memory allocation bits, and status bits.

Multiple different types of stamps are generated by stamps 320. A start stamp is created in the trace buffer whenever there is a transition from a paused state to a tracing state. This transition is detected using the start trace trigger.

When the HTM is enabled and in the run state, a mark stamp will be inserted into the trace data when a mark trigger occurs.

A freeze stamp is created and inserted into the trace data whenever the HTM receives a freeze trace trigger.

Time stamps are generated and inserted in the trace data when certain conditions occur. For example, when valid data appears after one or more idle cycles, a time stamp is created and inserted in the trace data.

SCOM stage 304 has an SCOM satellite 304c and SCOM registers 304a. SCOM satellite 304c is used for addressing the particular SCOM register. SCOM registers 304c include an HTM collection modes register, a trace memory configuration mode register, an HTM status register, and an HTM freeze address register. SCOM registers also includes mode bits 304b in which the various filter and capture modes are set.

Cast out stage 302 receives instructions for starting/stopping from processor cores 12, 14, SCOM stage 304, or global triggers through the fabric 36. SCOM stage 304 receives instructions that describe all of the information that is needed in order to perform a trace. This information includes an identification of which trace to receive, a memory address, a memory size, the number of write buffers that need to be requested, and a trace mode. This information is stored in registers 304a and mode bits 304b. This information is then provided to snoop stage 300 in order to set snoop stage 300 to collect the appropriate trace data from fabric 36.

SCOM stage 304 generates a trace enable signal 322 and signals 324.

Trace triggers 326 include a start trigger, stop trigger, pause trigger, reset trigger, freeze trigger, and an insert mark trigger. The start trigger is used for starting a trace. The stop trigger is used for stopping a trace. The pause trigger is used to pause trace collection. The reset trigger is used to reset the frozen state and reset to the top of trace buffer 306. The freeze trigger is used to freeze trace collection. The HTM will ignore all subsequent start or stop triggers while it is in a freeze state. The freeze trigger causes a freeze stamp to be inserted into the trace data. The insert mark trigger is used to insert a mark stamp into the trace data.

Trace triggers 326 originate from a trigger unit 325. Trigger unit 325 receives trigger signals from fabric 36, one of the cores 12, 14, or SCOM stage 304.

Signals 324 include a memory allocation done (mem_alloc_done) signal, trace modes signal, memory address signal, memory size signal, and a signal "N" which is the number of pre-requested write buffers.

According to the present invention, a configurable sequential address range, controlled by one or more of the memory controllers, is configured to be allocated to the trace function. This range can be statically assigned during the initial program load (IPL) or dynamically using software. Software will support allocation and relocation of physical memory on a system that has booted and is executing.

The process of allocation and relocation includes having the firmware declare a particular memory region as "defective" and then copying the current contents of the region to a new location. The contents of the region continue to be available to the system from this new location. This particular memory region is now effectively removed from the system memory and will not be used by other processes executing on the system. This particular memory region is now available to be allocated to the hardware trace macro for its exclusive use for storing hardware trace data.

To define this memory, the software that controls the HTM will write to an SCOM register using calls to the hypervisor. This SCOM register has a field that is used to define the base address and the size of the requested memory. The HTM will then wait until a Mem_Alloc_Done signal is received before it starts using the memory.

After enabling the HTM and allocating system memory in which to store trace data, the HTM will start the process of collecting trace data by selecting one of its inputs, i.e. inputs 310, to be captured. The trace routine that is controlling the HTM will define the memory beginning address, the memory size, and the maximum number of write buffers that the HTM is allowed to request before it has trace data to store.

To initiate the write buffer allocation process, the HTM will serially drive a series of cast out requests to the fabric controller bus, one for each number of write buffers that are allowed. If no write buffers are pre-allocated, the HTM will send a cast out request each time it has accumulated a cache line of data. A cache line of data is preferably 128 bytes of data.

The HTM will keep a count of the number of write buffers currently allocated to the HTM. Upon receiving a response from the fabric bus controller that a write buffer has been allocated to the HTM, the HTM will increment the count of the number of allocated buffers. This response will include routing information that identifies the particular memory controller that allocated the write buffer and the particular write buffer allocated. The HTM will save the routing information received from the fabric bus controller as a tag in Dtag buffer 308. This information will be used when the HTM generates a cast out data request that indicates that the HTM has trace data in trace buffer 306 that is ready to be stored in the system memory. If the response from the fabric bus controller indicates that a write buffer was not allocated, the HTM will retry its request.

When the HTM receives a start trace trigger, the HTM will begin collecting the trace that is selected using signals 312. Multiplexer 313 is controlled by signals 312 to select the desired trace. The trace data is then received in trace record 314 and then forwarded to trace buffer 306. At the start of the trace, prior to saving any trace data, a start stamp from stamps 320 is saved in trace buffer 306 to indicate the start of a trace.

When the HTM has collected 128 bytes of data, including trace data and any stamps that are stored, the HTM will send a cast out data request signal to the fabric bus controller if there is at least one write buffer allocated to the HTM. Otherwise, the HTM will request the allocation of a write buffer, wait for that allocation, and then send the cast out data request. Trace buffer 306 is capable of holding up to four cache lines of 128 bytes each. Once trace buffer 306 is full, it will start dropping these trace records. An 8-bit counter increments for every dropped record during this period of time that the buffer is full. If the 8-bit counter overflows, a bit is set and the counter rolls over and continues to count. When the buffer frees up, a timestamp entry is written before the next valid entry is written.

The fabric bus controller will then copy the data out of trace buffer 306 and store it in the designated write buffer. The HTM will then decrement the number of allocated write buffers.

When the HTM receives a stop trace trigger, the HTM will stop tracing.

Figure 4:
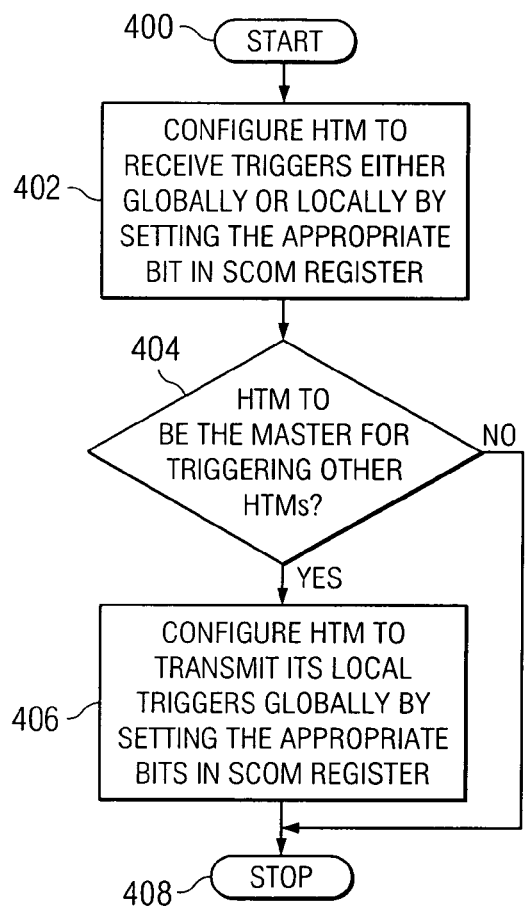
FIG. 4 depicts a high level flow chart that illustrates configuring a hardware trace macro (HTM) to receive its triggers either locally from within the HTM or globally using the standard existing bus fabric in accordance with the present invention.

FIG. 4 depicts a high level flow chart that illustrates configuring a hardware trace macro (HTM) to receive its triggers either locally from within the HTM or globally using the standard existing bus fabric in accordance with the present invention. The process starts as depicted by block 400 and thereafter passes to block 402 which illustrates configuring an HTM to receive its triggers either locally from within the HTM or globally from another HTM using the standard existing bus fabric. The HTM is configured by setting the appropriate bits in SCOM registers 304a to indicate either "local" or "global".

Next, block 404 depicts a determination of whether or not this HTM is to be configured to be a master HTM within the data processing system. The master HTM synchronizes the triggering of the HTMs in the data processing system that are configured to be triggered globally. The master HTM is always configured to be triggered globally. Thus, the master HTM will snoop the bus and retrieve triggers from the standard fabric protocol. All of the HTMs that are configured to be triggered globally, including the master HTM, are triggered synchronously with the master HTM by receiving the triggers across the fabric. Thus, all of the HTMs that are configured to be triggered globally receive the triggers at fixed elapsed time because all of these HTMs snoop the bus traffic and capture the triggers during a fixed number of clock cycles.

Referring again to block 404, if this HTM is not to be configured to be a master HTM within the data processing system, the process terminates as depicted by block 408. Referring again to block 404, if this HTM is to be configured to be a master HTM within the data processing system, the process passes to block 406 which illustrates configuring this HTM to transmit its local triggers globally by setting the appropriate bits in SCOM registers 304a. In this manner, all HTMs, that are configured to receive global triggers, in the data processing system will be triggered by the triggers that occur locally within the processor that includes the master HTM. The process then terminates as depicted by block 408.

Figure 5:
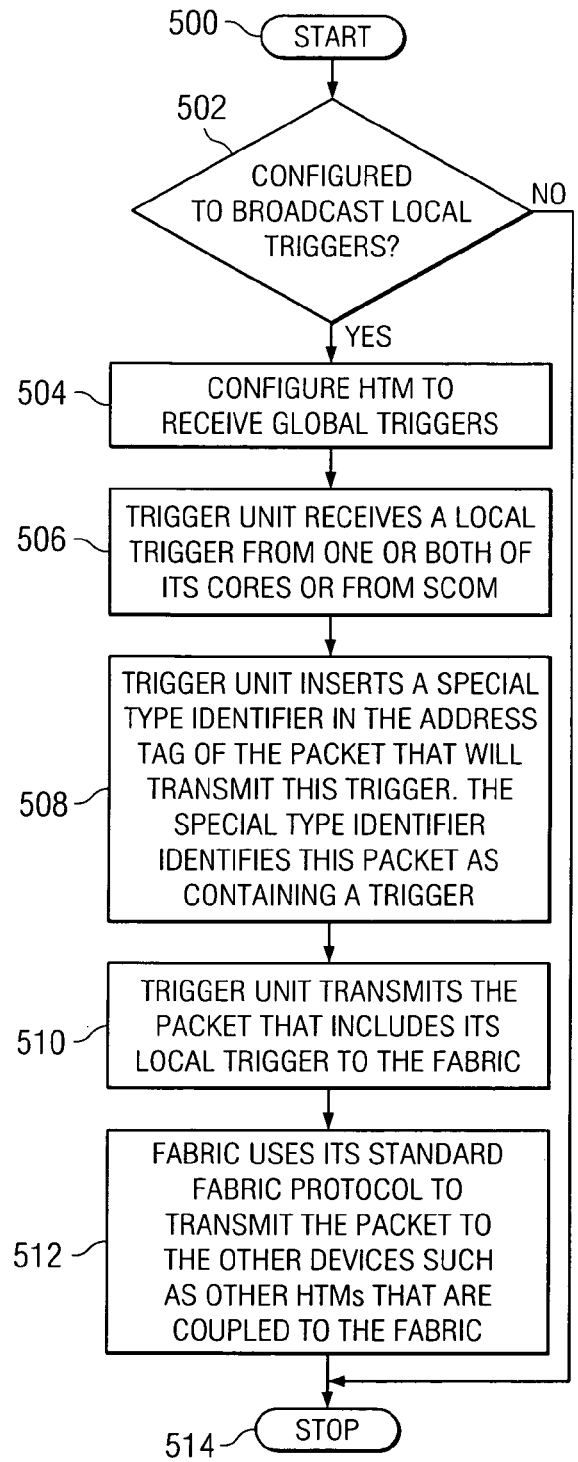
FIG. 5 illustrates a high level flow chart that depicts configuring a hardware trace macro (HTM) to broadcast its local triggers globally using the standard existing fabric bus in accordance with the present invention.

FIG. 5 illustrates a high level flow chart that depicts configuring a hardware trace macro (HTM) to broadcast its local triggers globally using the standard existing fabric bus in accordance with the present invention. The process starts as depicted by block 500 and thereafter passes to block 502 which illustrates a determination of whether or not this HTM is configured to broadcast its local triggers. This is a determination of whether or not this HTM is configured to be a master HTM for synchronizing the triggering of the HTMs in the data processing system that are configured to be triggered globally. This determination is made by analyzing the bits in this HTM's SCOM registers 304a to determine whether the bit that indicates whether to broadcast is set.

Referring again to block 502, if a determination is made that this HTM is not configured to broadcast its local triggers, the process terminates as illustrated by block 514. Referring again to block 502, if a determination is made that this HTM is configured to broadcast its local triggers, the process passes to block 504 which depicts configuring this HTM to receive global triggers by setting the appropriate bit in this HTM's SCOM registers 304a.

The process then passes to block 506 which illustrates this HTM's trigger unit receiving a local trigger from one or both of its cores or from the SCOM stage. Thereafter, block 508 depicts this HTM's trigger unit inserting a special "type" identifier in the address of the packet which will include this trigger. The special "type" identifier identifies this packet as containing a trigger. Next, block 510 illustrates the trigger unit transmitting the packet that includes this trigger to the standard fabric using the standard fabric protocol. Thereafter, block 512 illustrates the fabric using its standard fabric protocol to transmit the packet to the other devices, such as the other HTMs, that are coupled to the fabric. The process then terminates as depicted by block 514.

Figure 6:
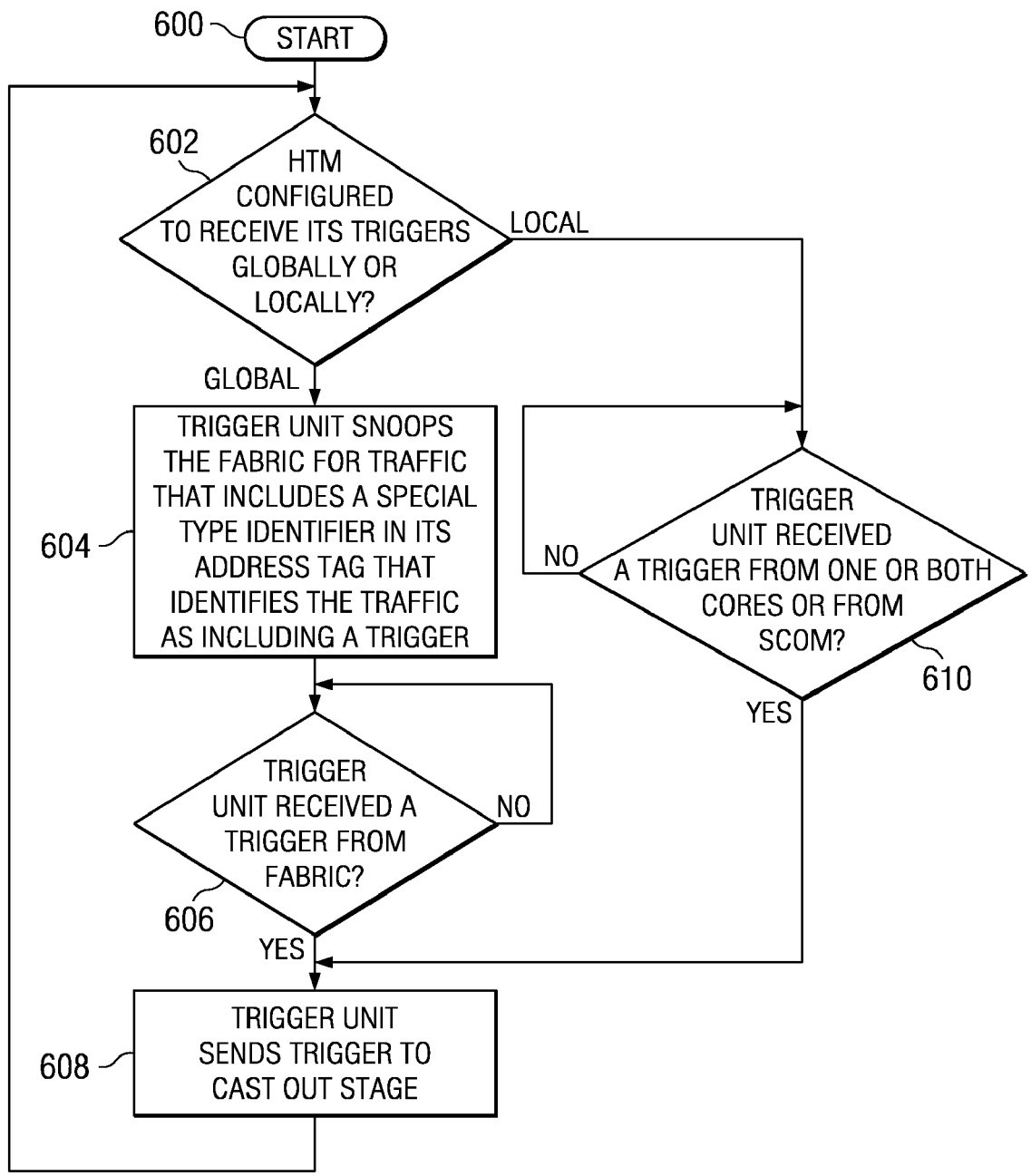
FIG. 6 depicts a high level flow chart that illustrates a hardware trace macro (HTM) receiving triggers in accordance with the present invention.

FIG. 6 depicts a high level flow chart that illustrates a hardware trace macro (HTM) receiving triggers in accordance with the present invention. The process starts as illustrated by block 600 and thereafter passes to block 602 which depicts a determination of whether this HTM is configured to receive its triggers globally or locally. If a determination is made that this HTM is configured to receive its triggers globally, the process passes to block 604 which illustrates this HTM's trigger unit snooping the fabric for traffic that includes a special "type" identifier in its address tag that identifies the traffic packet as including a trigger.

The process then passes to block 606 which depicts a determination of whether or not this HTM's trigger unit received a trigger from the fabric. If a determination is made that the trigger unit did not receive a trigger from the fabric, the process passes back to block 606. If a determination is made that the trigger unit did receive a trigger from the fabric, the process passes to block 608 which depicts this HTM's trigger unit sending the trigger it received from the fabric to this HTM's cast out stage in order to trigger the tracing process of this HTM. The process then passes back to block 602.

Referring again to block 602, if a determination is made that this HTM is configured to receive its triggers locally, the process passes to block 610 which illustrates a determination of whether or not this HTM's trigger unit received a trigger from one or both of this HTM's cores or from this HTM's SCOM stage. If a determination is made that the trigger unit did not receive a trigger from one or both of this HTM's cores or from this HTM's SCOM stage, the process passes back to block 610. If a determination is made that the trigger unit did receive a trigger from one or both of this HTM's cores or from this HTM's SCOM stage, the process passes to block 608 which depicts this HTM's trigger unit sending the trigger it received from the local cores or SCOM to this HTM's cast out stage in order to trigger the tracing process of this HTM.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for synchronizing the triggering of a plurality of hardware trace facilities using a system bus, said method comprising:
    said plurality of hardware trace facilities including a first hardware trace facility and a second hardware trace facility;
    said data processing system including a first processor that includes said first hardware trace facility and a first plurality of processing units that are coupled together utilizing said system bus;
    said data processing system including a second processor that includes said second hardware trace facility and a second plurality of processing units that are coupled together utilizing said system bus;
    transmitting information among said first and second plurality of processing units utilizing said system bus when said first and second processors are in a normal, non-tracing mode, said information being formatted according to a standard system bus protocol;
    transmitting trigger events to said plurality of hardware trace facilities utilizing said system bus, said trigger events being formatted according to said standard system bus protocol;
    selecting one of said plurality of hardware trace facilities to be a master hardware trace facility; and
    transmitting trigger events generated within said master hardware trace facility from said master hardware trace facility to said plurality of hardware trace facilities utilizing said system bus.

2. The method according to claim 1, further comprising:
    triggering said plurality of hardware trace facilities utilizing said transmitted trigger events, said plurality of hardware trace facilities being triggered synchronously.

3. The method according to claim 1, further comprising:
    transmitting, by said master hardware trace facility, said trigger events generated within said master hardware trace facility to all of said plurality of hardware trace facilities including said master hardware trace facility; and
    triggering said all of said plurality of hardware trace facilities including said master hardware trace facility utilizing said transmitted trigger event.

* * * * *